April 17, 1956  H. F. PITCAIRN ET AL  2,742,095
MECHANISM FOR BALANCING SINGLE BLADE AIRCRAFT ROTOR
Filed June 17, 1948  2 Sheets-Sheet 1
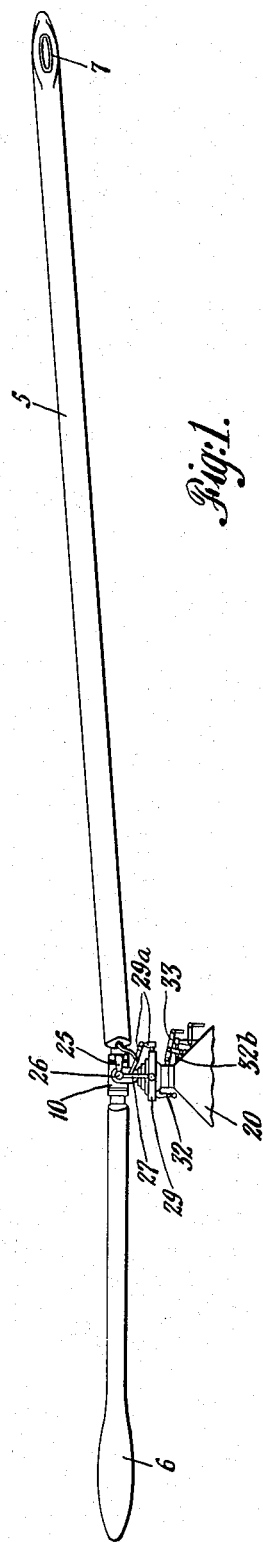
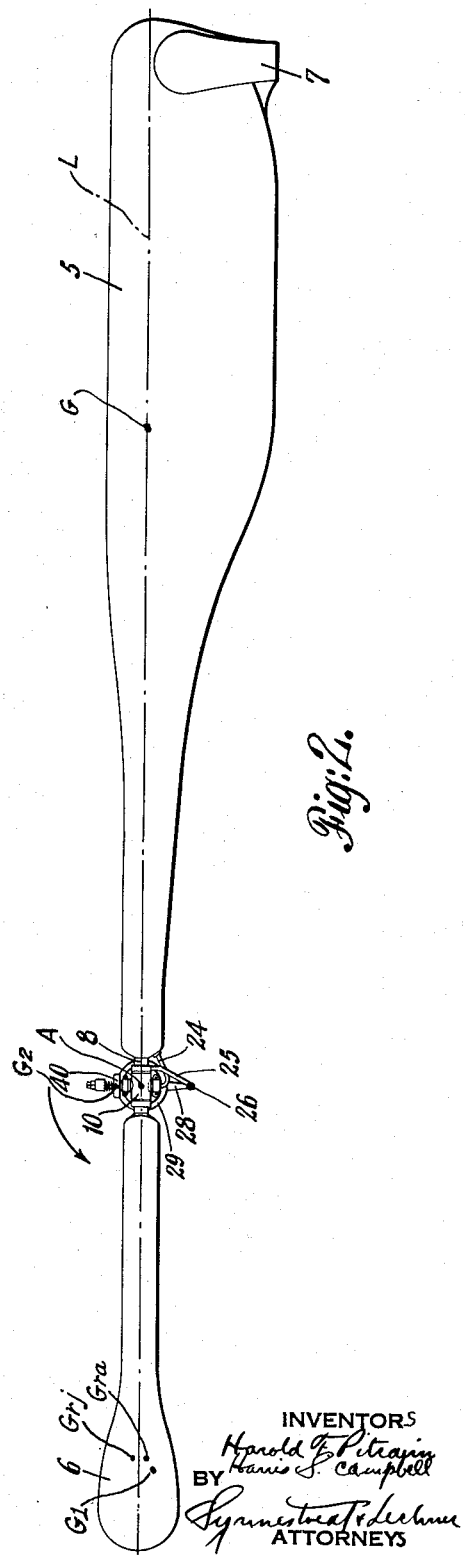

United States Patent Office 2,742,095
Patented Apr. 17, 1956

2,742,095

MECHANISM FOR BALANCING SINGLE BLADE AIRCRAFT ROTOR

Harold F. Pitcairn and Harris S. Campbell, Bryn Athyn, Pa., assignors to Autogiro Company of America, Philadelphia, Pa., a corporation of Delaware Application June 17, 1948, Serial No. 33,518

11 Claims. (Cl. 170—159.1)

This invention relates to air rotors and more particularly to an aircraft sustaining rotor of the counterweighted single blade type.

The invention contemplates a rotor of the character mentioned which is adapted alternatively for autorotational operation and for powered drive by means of a jet driving device carried by the blade.

As is known, in a rotor incorporating a single counterweighted blade, because of the relatively large rotational drag of the blade as compared with the rotational drag of the counterweight, a force is set up during rotation tending to cause the rotor mounting hub or axle to move in a circular path, notwithstanding accurate static balance as between the blade and counterweight.

As is brought out in Patent 2,297,815, issued October 6, 1942, to Gage W. Tidd, the dynamic unbalance present in a hub driven counterweighted single blade rotor (as a result of the differential rotational drag of the blade and counterweight) may be compensated by slightly offsetting the center of gravity of the counterweight from a line containing the center of gravity of the blade and intersecting the rotational axis, the direction of offset being toward that side of said line toward which the leading edge of the blade is presented.

In a counterweighted single blade rotor operating under autorotational condition a dynamic unbalance is set up the compensation for which requires an offset of the center of gravity of the counterweight toward the trailing edge of the blade, and when so compensated the accuracy of compensation will be retained notwithstanding variation in rotor R. P. M.

In the case of a rotor incorporating a single counterweighted blade capable of autorotation and further carrying a jet driving device as contemplated by the present invention, the difference between the effective rotational drag of the blade and the rotational drag of the counterweight varies as between the condition of autorotation and the condition of jet drive.

With the foregoing in mind, the present invention provides for proper compensation for both autorotative and jet driven operation, and still further provides for automatic variation of the compensation force as between these two conditions of operation.

In the preferred rotor of the invention, this is accomplished by making provision for operation of the rotor at an appreciably higher R. P. M. when being jet driven, as compared with the autorotative condition, and by mounting a shiftable weight on the rotor hub, with bias means acting on the weight in such manner that under the autorotative condition of operation the weight occupies one position, and, under the jet driven condition of operation, the weight shifts outwardly because of the increased centrifugal force, due to the higher R. P. M. then prevailing.

The invention also contemplates improvement in rotor blade and counterweight mounting and hub structure therefor. For example, in the preferred rotor of the invention the blade and counterweight are directly interconnected and are mounted on the hub by means of a common horizontal pivot providing freedom for flapping movement of the blade.

According to the invention, moreover, provision is made for blade pitch change and for this purpose the interconnecting member between the blade and counterweight is journaled on the hub part. In this way, the centrifugal load of the blade and counterweight balance each other without requiring transmission of such load to the hub, notwithstanding the mounting of the blade with freedom for pitch change movement.

How the foregoing and other objects and advantages are attained will appear more fully from the following description, referring to the accompanying drawings, in which—

Figure 1 is an elevational view of an aircraft sustaining rotor constructed according to the invention;

Figure 2 is a plan view of the rotor shown in Figure 1;

Figure 3:
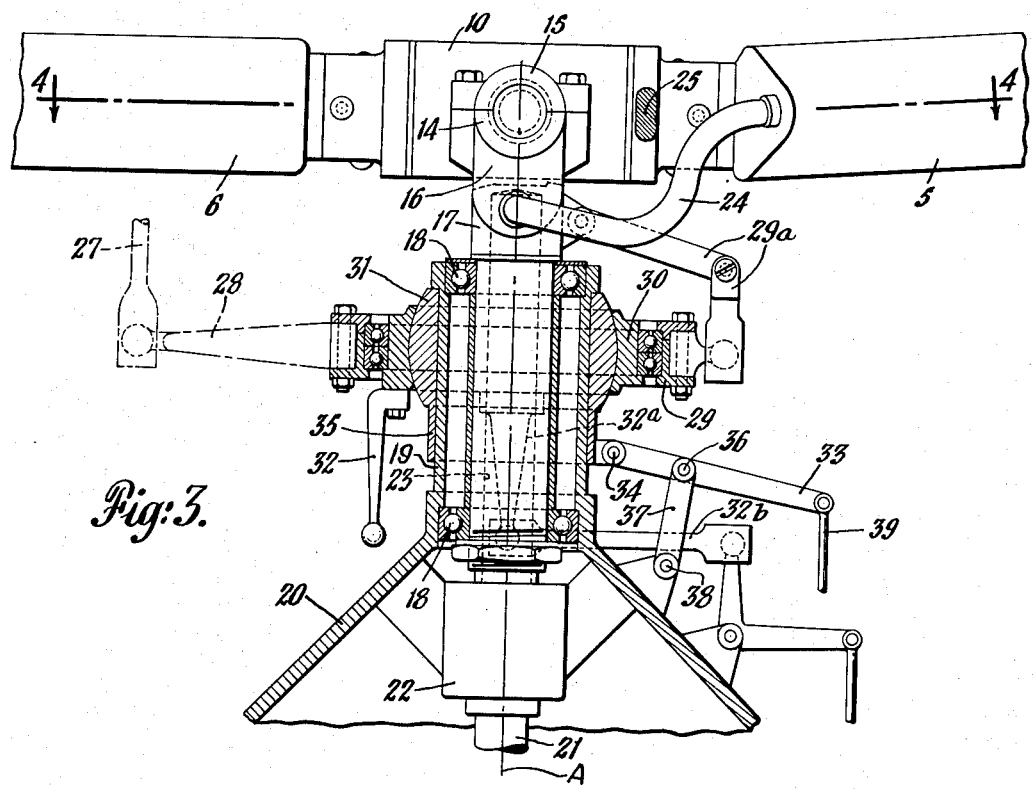
Figure 3 is an enlarged side view showing the rotor hub in elevation and further showing portions of the rotor hub mounting in vertical section.

Referring to the drawings, the single blade of the rotor is indicated by the numeral 5, the counterweight being shown at 6. The blade is provided with a jet driving device indicated at 7. The details of this jet driving device need not be considered herein since they form no part of the present invention per se.

Figure 4:
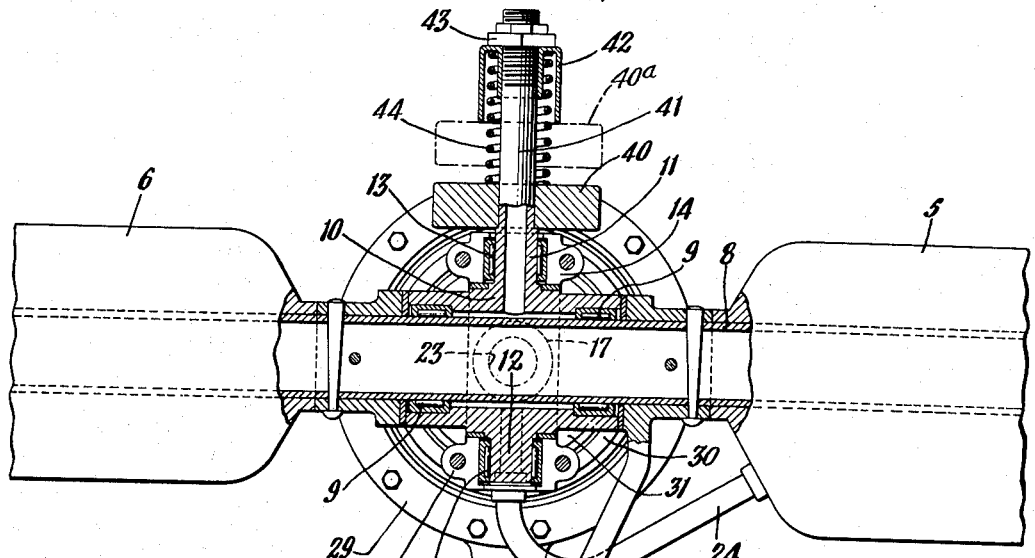
Figure 4 is a horizontal sectional view taken as indicated by the section line 4—4 on Figure 3.

The blade is provided with a root end mounting member 8, desirably constituting a continuation of a spar on which the blade structure is built up. As seen in Figure 4 this mounting member 8 extends through the rotor hub and counterweight 6 is attached to the opposite end thereof so that the blade and counterweight are directly interconnected. Advantageously the blade is connected with the mounting member 8 with the blade axis inclined upwardly at a dihedral angle as is shown in Figure 1.

As is apparent from Figure 4, the spar member 8 is journaled on the hub by means of bearings 9—9 which are supported in the hub part 10. Hub part 10 has a pair of projecting pivots or trunnions 11—12 which are journaled by bearings 13—13 mounted between bearing blocks 14—14 having bearing caps one of which appears at 15 in Figure 3. The bearing blocks 14—14 are arranged at the ends of the prongs of a fork 16 extended upwardly from the rotative hub spindle 17. The hub spindle is journaled by bearings 18—18 in a supporting sleeve 19 formed at the upper end of a mounting structure 20 adapted to be secured to the body of the aircraft.

Fuel for operating the jet device 7 at the blade tip is supplied through pipe 21 having a rotative connection 22 with a central passage 23 formed in the axle 17. A flexible tube 24 is connected with the upper end of the passage 23 and extends to the root end of the blade. A conduit may be extended through the blade to the jet device 7.

The pitch angle of the blade is adapted to be controlled by means of an arm 25, this arm being connected by a universal joint 26 with an upright link 27 which, in turn, is universally coupled with an arm 28 projecting from the rotative swash ring 29. Link 27 and arm 28 are shown in chain-dotted lines at the left of Figure 3 merely for the sake of illustration.

Ring 29 is journaled on the nonrotative swash member 30 (see Figure 3). Swash member 30 is universally tiltable on the spherical support 31 and ring 29 is caused to rotate with the rotor by means of the scissors linkage 29a. Tilting movement of the swash member 30 may be effected by means of control arms 32 and 32a having operating connections associated therewith such as indicated at 32b, the details of which, however, need not be considered herein. The spherical support 31 is mounted for vertical movement effected by means of a lever 33 pivoted at 34 to a sleeve like extension 35 extending downwardly from the support 31. Lever 33 is fulcrumed at 36 on a link 37 which is pivoted to the fixed supporting structure as at 38. A push-pull connection 39 may be employed as a part of the control connections for moving lever 33 and thus causing the swash members to shift vertically.

With respect to the pitch control elements above described attention is called to the fact that the universal connection 26 between the arm 25 and the link 27 is so located as to lie close to or on the axis of the trunnions 11—12 providing for flapping movement of the blade. With this location flapping movements of the blade do not introduce appreciable pitch change movements.

In accordance with the preferred counterbalancing and compensation arrangement of the invention, the system includes not only the main counterweight 6 but also an auxiliary counterweight 40 which is arranged in the manner best shown in Figure 4. Here it will be seen that a weight 40 is mounted for movement toward and away from the axis of the rotor on an extension 41 of the pivot or trunnion 11. Toward the outer end of the extension 41 a cup shaped stop member 42 is provided, being secured to the extension 41 by means of nut 43. A spring 44 acts in compression between the weight 40 and the base of the cup 42. The inner edge or lip of the cup 42 serves as a stop for outward movement of the weight 40, this stop being adjustable by means of the nut 43.

As diagrammatically illustrated in Figure 2, the line or plane L intersects the center of gravity G of the blade 5 and the axis A of the rotor. The center of gravity G-1 of the main counterweight 6 is offset from the line L toward the trailing edge of the blade while the center of gravity G-2 of the auxiliary counterweight 40 is offset from the line L toward the leading edge of the blade.

In this preferred counterbalancing system, the resultant center of gravity $G_{ra}$ of the main counterweight 6 and of the auxiliary weight 40, under autorotative conditions, is slightly offset from the line L, the direction of offset being toward that side of said line toward which the trailing edge of the blade is presented. This provides proper counterbalancing for the autorotative condition of operation. It will be noted, however, that the auxiliary weight 40 considered by itself is offset forwardly of said line and it should here be noted that the invention contemplates a considerably higher rotor R. P. M. under the jet driven condition of operation. This increase in rotor R. P. M. results in an increase in centrifugal force acting on the auxiliary weight 40, which will cause the auxiliary weight to move outwardly on the support 41 against the edge of the cup 42. Shift in position of the auxiliary weight 40 outwardly alters the location of the center of gravity of the two weights taken together, in a direction to bring the combined center of gravity from the position $G_{ra}$ toward the line L. This is the desired direction of shift of the center of gravity of the counterweight means when changing from autorotation to the condition of jet drive. Depending upon the design of the particular rotor, the proper position of the center of gravity of the counterweight means for the jet driven condition will always be forward of the proper position for autorotative operation, and may even be forward of the line L containing the center of gravity of the blade and intersecting the rotor axis, i. e., it may move to the position $G_{rj}$ (representing the resultant center of gravity of the total counterweight means under jet driven conditions).

The spring 44 acting on the weight 40 is of such strength as to retain the weight in its inner position during autorotative operation of the rotor, notwithstanding slight variations of rotor R. P. M. which may occur under autorotative conditions. However, when the rotor speeds up substantially in response to operation of the jet drive, the action of centrifugal force on the weight effects compression of spring 44 and the weight moves outwardly according to the increase in speed of the rotor, the weight finally coming against the lip of the cup 42 at the dotted position 40a.

With a counterbalancing and compensating system as above described, the weight 40 provides accurate compensation for the dynamic unbalance introduced as a result of the difference in rotational drag of the blade and counterweight 6, during autorotative operation of the rotor. During jet driven operation of the rotor, the resultant drag of the blade acting about the rotor axis is appreciably increased as compared with the autorotative condition, because the drag increases in proportion to the square of the velocity. Thus, if the jet driven speed is 50% higher than the autorotational velocity, the drag forces increase 2.25 times. However, the centrifugal force developed by the weight also increases as the square of the rotational speed so that the drag forces would be in balance. In order to drive the rotor at this increased velocity, the jet force has been added to the system and since this is an eccentric force, a force of proper value acting in a direction to counteract the reaction of the jet force at the hub is needed.

With the arrangement of jet as shown, the dynamic unbalance developed by the jet is compensated by the shift of the weight 40 toward or to its outer position, according to the increase in rotor R. P. M. It is contemplated that at the normal R. P. M. of jet drive, the weight 40 should abut the outer stop, and since a given position of the weight 40 will accurately compensate for the dynamic unbalance for only a predetermined rotor R. P. M., the invention further contemplates means for adjusting the outer stop so as to ensure establishment of a weight position providing the proper compensation for the dynamic unbalance arising at the normal R. P. M. under the jet driven condition.

From the above it will be seen that the invention provides a compensating weight which is offset from the line containing the center of gravity of the blade and intersecting the rotational axis, such weight being automatically adjustable by variation of degree of offset, according to the conditions of operation of the rotor.

We claim:

1. A single bladed aircraft sustaining rotor adapted alternatively for powered and autorotational operation, pitch control mechanism for said blade, a jet driving device carried by the blade for powered operation thereof, counterweight means mounted to rotate with said blade, the center of gravity of the counterweight means during autorotational operation being offset in a direction toward the trailing edge of the blade from a line containing the center of gravity of the blade and intersecting the rotor axis, and the counterweight means including a weight element whose center of gravity is offset from said line and adjustably movable to different degrees of offset from said line whereby to shift said center of gravity, the movement of the weight element being independent of the operation of said pitch control mechanism.

2. A construction according to claim 1 and further including bias means acting on said weight element and normally urging the weight element toward said line.

3. A construction according to claim 1 in which the counterweight means comprises two weight elements one of which is of relatively small mass and is mounted in offset position at the leading edge side and the other of which is of relatively large mass and substantially diametrically opposite to the blade, the center of gravity of which is offset from said line in a direction toward the trailing edge of the blade.

4. In an aircraft sustaining rotor, a single counterweighted sustaining blade adapted alternatively for powered operation at a relatively high R. P. M. and for autorotational operation at a relatively lower R. P. M., pitch control mechanism for said blade, a jet driving device carried by the blade to provide for powered operation thereof, in which construction the blade drag moment about the axis of the rotor is different as between powered and autorotational operation, and mechanism operable independently of the operation of said pitch control mechanism to shift the center of gravity of the counterweight toward and away from a plane containing the center of gravity of the blade and the rotational axis of the rotor whereby to variably balance the blade drag forces under the different conditions of operation.

5. A construction according to claim 4 in which said mechanism comprises a weight mounted on the rotor at a position radially offset from the rotor axis and adjustably movable in a generally horizontal direction transverse the blade axis.

6. A construction according to claim 5 and further including a yielding bias device associated with said weight and acting thereon in a direction in opposition to that in which centrifugal force acts thereon.

7. A construction according to claim 4 in which said mechanism comprises a weight mounted on the rotor at a position offset from the rotor axis in a direction ahead of the blade axis, said weight being adjustably movable in a path toward and away from the rotor axis.

8. A construction according to claim 7 and further including a bias device yieldingly urging the weight toward the rotor axis.

9. In an aircraft sustaining rotor, a single counterweighted sustaining blade adapted alternatively for powered and autorotational operation, pitch control mechanism for said blade, a jet driving device carried by the blade to provide for powered operation thereof, in which construction the resultant drag forces at the axis of the rotor are different as between powered and autorotational operation, a rotor mounting trunnion supported in bearings to provide for blade movement transverse the mean path of rotation of the blade, and mechanism for variably balancing the blade drag forces under the different conditions of operation comprising a weight associated with said trunnion and adjustably movable axially thereof independently of the operation of said pitch control mechanism.

10. In an aircraft sustaining rotor adapted alternatively for powered operation at a relatively high R. P. M. and for autorotational operation at a relatively lower R. P. M.: a rotor hub; a single sustaining blade connected to the hub and having a jet driving device to provide for powered operation thereof; a main counterweight fixedly connected to the hub for substantially counterbalancing the action of centrifugal force on said blade; and an auxiliary counterweight connected to the hub and being shiftable in a direction radially of the axis of rotation of the rotor for substantially compensating for the differential drag forces acting at the rotor axis when the rotor is in autorotational condition and in jet driven condition, when the auxiliary counterweight is in position to compensate for said autorotational condition the resultant center of gravity of the counterweights being offset from a line intersecting the center of gravity of the blade and passing through said rotational axis, the direction of offset being toward the trailing edge of the blade.

11. In an aircraft sustaining rotor adapted alternatively for powered operation at a relatively high R. P. M. and for autorotational operation at a relatively lower R. P. M.: a rotor hub; a single sustaining blade connected to the hub and having a jet driving device to provide for powered operation thereof; pitch control mechanism for said blade; counterweight means connected to the hub, the center of gravity of said means being offset from a plane intersecting the center of gravity of the blade and passing through the rotational axis of the rotor, the direction of offset being toward the trailing edge of the blade; and mechanism operable independently of the operation of said pitch control mechanism for variably shifting the center of gravity of said means in a direction toward and away from said plane.

References Cited in the file of this patent

UNITED STATES PATENTS

| | | |
|---|---|---|
| 2,242,457 | Cierva | May 20, 1941 |
| 2,297,815 | Tidd | Oct. 6, 1942 |
| 2,371,160 | Everts | Mar. 13, 1945 |
| 2,475,318 | Gluhareff | July 5, 1949 |
| 2,498,283 | Lee | Feb. 21, 1950 |